UNITED STATES PATENT OFFICE.

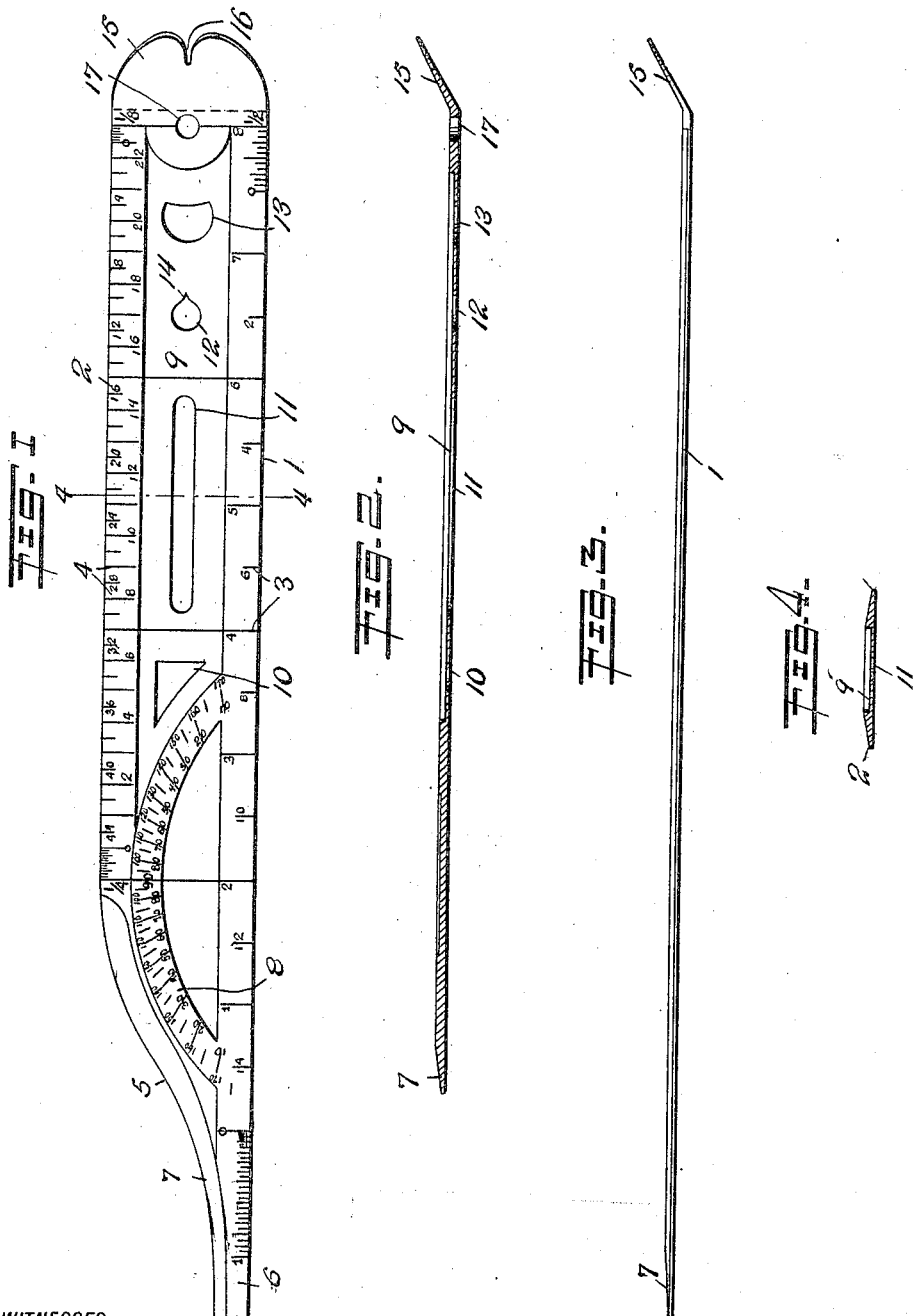

HERBERT R. MAINZER, OF NEW YORK, N. Y.

PAPER-CUTTER.

1,047,426.

Specification of Letters Patent. Patented Dec. 17, 1912.

Application filed February 3, 1912. Serial No. 675,211.

*To all whom it may concern:*

Be it known that I, HERBERT R. MAINZER, of New York city, county of New York, State of New York, have invented a new and useful Improvement in Paper-Cutters, of which the following is a specification.

This invention relates to an implement suitable for commercial and domestic use.

The object of the invention is to provide a simple, attractive and handy device, of indestructible construction, and adapted for a wide range of usefulness. The device is a thin, flat, blade-like structure, which may lie flat on the desk or work-table or be suspended if desired. It will be a great convenience to architects, draftsmen and engineers, and will also serve admirably as a paper-cutter, check-cutter, paper-folder and book-mark. It is also so constructed as to constitute a convenient erasing shield for use by draftsmen, typewriters and others. As an architect's, draftsman's or engineer's implement, it will have added usefulness by reason of embodying architect's and other scales, a protractor, a French curve and edge rules. As a domestic implement it may be used to advantage as a tack-lifter and as a string-cutter. Its tack-lifting portion is so constructed that it is peculiarly adapted to the lifting of thumb tacks on drawing boards. In addition, it may be used with advantage for numerous other purposes. Its various features will now be described in detail, reference being had to the accompanying drawings wherein, Figure 1 is a plan view of the device; Fig. 2 is a central longitudinal section therethrough; Fig. 3 is a side elevation; and Fig. 4 is a transverse section on the line 4—4 of Fig. 1.

The device is thin, flat and elongated, being preferably formed from sheet metal, of any suitable kind or any suitable finish. It has opposite, straight, parallel, longitudinal edges 1 and 2, constituting ruling edges, the surface of the body being beveled downward to these edges as shown in Fig. 4. These ruling edges are provided with graduations 3 and 4, suitably numbered, constituting them an architect's scale. The forward continuation of the edge 2 is curved as shown at 5, in the form of a French curve. This formation reduces the end of the body of the device, so as to provide a narrow finger 6, admirably adapted for use as an envelop opener, and also for other purposes. The curved edge of this forward part of the device is beveled as shown at 7, so as to form a comparatively sharp cutting edge.

Toward its forward part the surface of the device is provided with a curved protractor scale 8. The surface of the device, between the side bevels and between the protractor scale and the other end of the device is depressed, as shown at 9; and in the thin wall thus afforded are formed openings 10, 11, 12 and 13, of varying shapes, enabling the device to be used with advantage as an erasing shield. The opening 12 may have a V-shape recess or extension 14 at one side thereof, suitable for cutting string. The rear or upper end of the blade-like device is bent up at an angle, as shown at 15, and the end of this angle portion is provided with a notch 16. This angle portion 15 preferably grows thinner toward its end, as shown in Figs. 2 and 3, so that it may be conveniently inserted beneath the heads of tacks, the notch 16 receiving the shanks thereof. The device may then be used as a lever, in the well-known manner, to unseat the tack. Near its rear or upper end, preferably immediately below the angle portion 15, the device is provided with an opening 17, by means of which it may be hung on a hook or other hanging means.

In addition to the functions pointed out in the course of the preceding description, the device will be a great convenience to draftsmen and others, since its thin blade-like structure adapts it for use as a book-mark. The device may also be employed as a paper-folder. Either of the straight bevel side edges of the device enables it to be used as a check-cutter or for tearing paper along a straight line or for any other purpose.

It will be seen that the formation of the curved cutting edge 5 causes the end portion of the device to taper or decrease in width, so that the edge is, in effect, graduated, so that the implement is adapted to open envelops of different size.

All of the scales are preferably formed on one side or surface of the device, with the figures all reading one way.

What is claimed as new is:

A thin, flat, blade-like implement having parallel, longitudinal ruling edges provided with scales, and a protractor scale on its surface, one of the longitudinal edges being formed as a French curve toward one end, thus narrowing this part of the implement.

HERBERT R. MAINZER.

Witnesses:
CLARENCE G. GALSTON,
MAURICE HOTCHNER.